United States Patent
McIntyre

(10) Patent No.: US 12,441,080 B2
(45) Date of Patent: *Oct. 14, 2025

(54) CARPET WASTE COMPOSITE AND METHOD FOR MAKING SAME

(71) Applicant: Advanced Carpet Recycling, LLC, Bedford, TX (US)

(72) Inventor: Daniel R. McIntyre, Pagosa Springs, CO (US)

(73) Assignee: Advanced Carpet Recycling, LLC, Bedford, TX (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/314,238

(22) Filed: May 9, 2023

(65) Prior Publication Data
US 2023/0271403 A1    Aug. 31, 2023

Related U.S. Application Data

(63) Continuation-in-part of application No. 17/713,712, filed on Apr. 5, 2022, now Pat. No. 11,648,748,
(Continued)

(51) Int. Cl.
*B32B 5/26* (2006.01)
*B32B 5/02* (2006.01)
*B32B 5/06* (2006.01)

(52) U.S. Cl.
CPC ............. *B32B 5/26* (2013.01); *B32B 5/024* (2013.01); *B32B 5/06* (2013.01)

(58) Field of Classification Search
CPC .. B32B 5/26; B32B 5/024; B32B 5/06; B32B 37/02; B32B 37/04; B32B 37/12;
(Continued)

(56) References Cited

U.S. PATENT DOCUMENTS

| | | |
|---|---|---|
| 6,336,265 B1 | 1/2002 | Niedermair |
| 7,875,655 B2 | 1/2011 | Mancosh et al. |

(Continued)

FOREIGN PATENT DOCUMENTS

| | | |
|---|---|---|
| EP | 1264670 | 12/2002 |
| EP | 1795669 | 9/2015 |
| WO | 2013121189 | 8/2013 |

OTHER PUBLICATIONS

Abhishek Jain, Gajendra Pandey, Abhishek K. Singh, Vasudevan Rajagopalan, Fabrication of Structural Composites from Waste Carpet, journal, Oct. 19, 2011, pp. 380-389, Advances in Polymer Technology, vol. 31, No. 4, Wiley Periodicals Inc., U.S.

*Primary Examiner* — Cynthia L Schaller
(74) *Attorney, Agent, or Firm* — Scott Griggs; Griggs Bergen LLP

(57) ABSTRACT

A carpet waste composite and method for making the same are disclosed. In one embodiment of the method, cleaned, unadulterated layers of are provided. An initial, unfused carpet layer is made by placing two cleaned, unadulterated layers of carpet tufted side-to-tufted side with homogenous and adhesive contact therebetween. Heat and pressure followed by cooling are applied to furnish an initial, fused carpet layer. Carpet layers are iteratively added, as required, using heat and pressure followed by cooling to furnish a carpet waste composite. Plates are added in sealing engagement to surfaces of the composite construction material.

17 Claims, 8 Drawing Sheets

Related U.S. Application Data which is a continuation of application No. 17/162,839, filed on Jan. 29, 2021, now Pat. No. 11,292,230, which is a continuation-in-part of application No. 16/774,750, filed on Jan. 28, 2020, now Pat. No. 10,981,354, which is a continuation of application No. 16/528,332, filed on Jul. 31, 2019, now Pat. No. 10,611,121.

(60) Provisional application No. 63/378,388, filed on Oct. 5, 2022, provisional application No. 62/967,893, filed on Jan. 30, 2020, provisional application No. 62/715,401, filed on Aug. 7, 2018.

(58) Field of Classification Search
CPC ............. B32B 2471/02; B29B 17/0042; B29L 2031/7322; B29C 65/02
See application file for complete search history.

(56) References Cited

U.S. PATENT DOCUMENTS

| | | | |
|---|---|---|---|
| 10,611,121 | B2 | 4/2020 | McIntyre |
| 11,292,230 | B2* | 4/2022 | McIntyre ................. B32B 5/06 |
| 11,648,748 | B2* | 5/2023 | McIntyre ................ B32B 5/024 |
| | | | 156/60 |
| 2003/0034402 | A1* | 2/2003 | Mohr ..................... E01B 1/004 |
| | | | 238/109 |
| 2004/0224589 | A1 | 11/2004 | Bacon et al. |
| 2007/0082172 | A1 | 4/2007 | Derbyshire et al. |
| 2011/0135870 | A1* | 6/2011 | Gleich ................... B32B 27/06 |
| | | | 428/95 |
| 2014/0263683 | A1* | 9/2014 | Krishnan ................. B28B 1/14 |
| | | | 264/85 |
| 2020/0231735 | A1 | 7/2020 | Salsman |
| 2021/0154971 | A1* | 5/2021 | McIntyre ................. B32B 1/00 |
| 2022/0227097 | A1 | 7/2022 | McIntyre |

\* cited by examiner

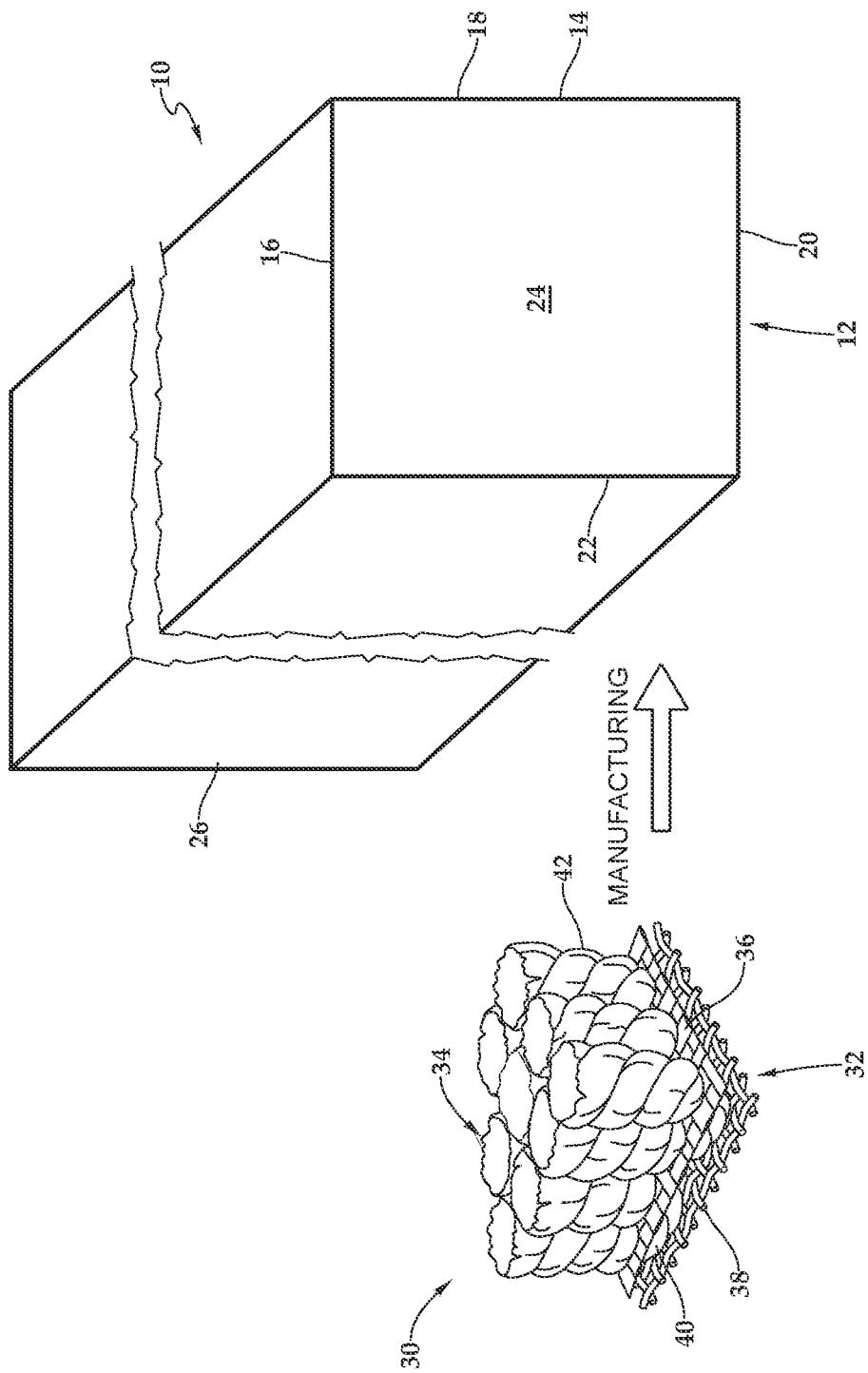

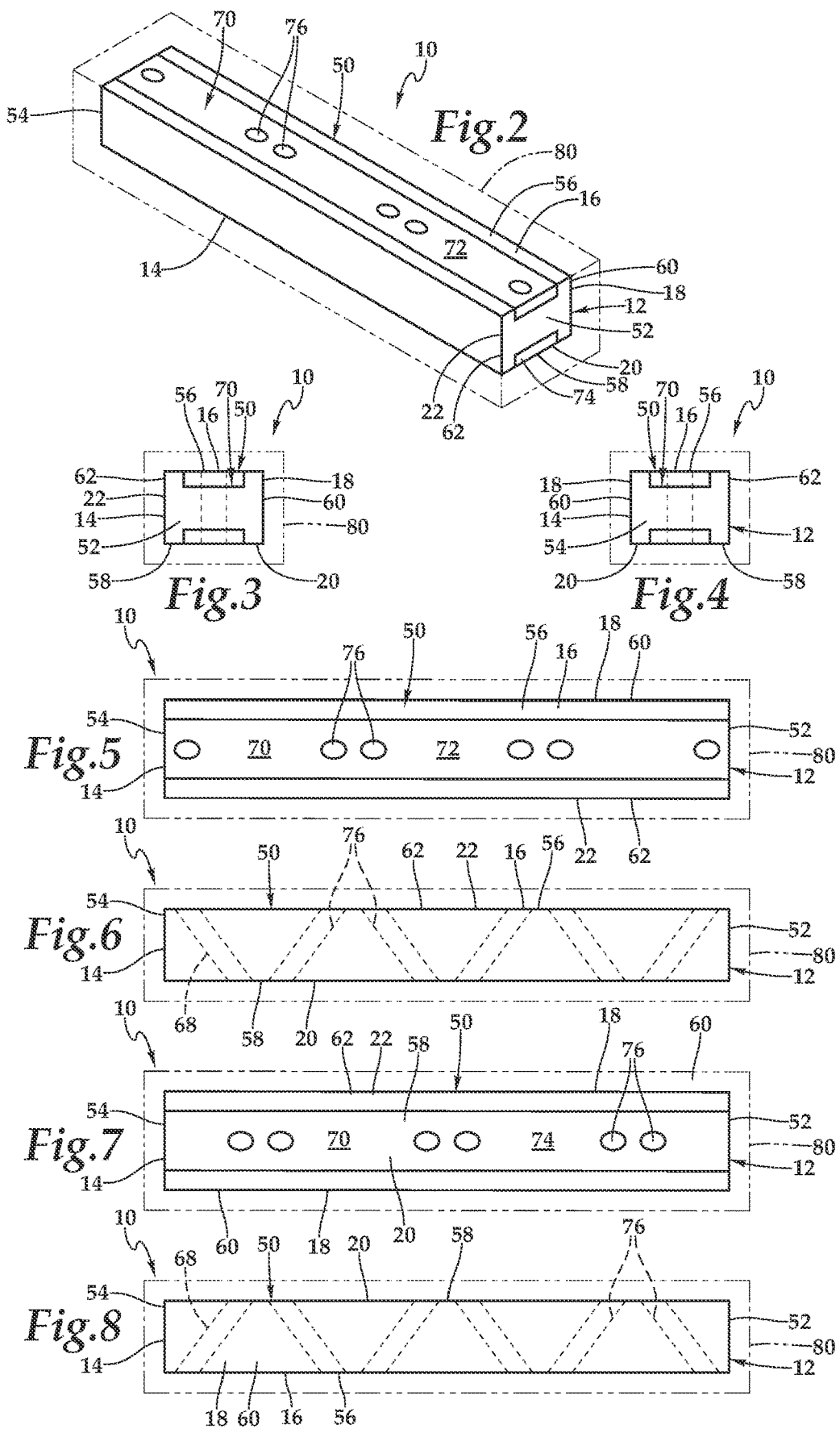

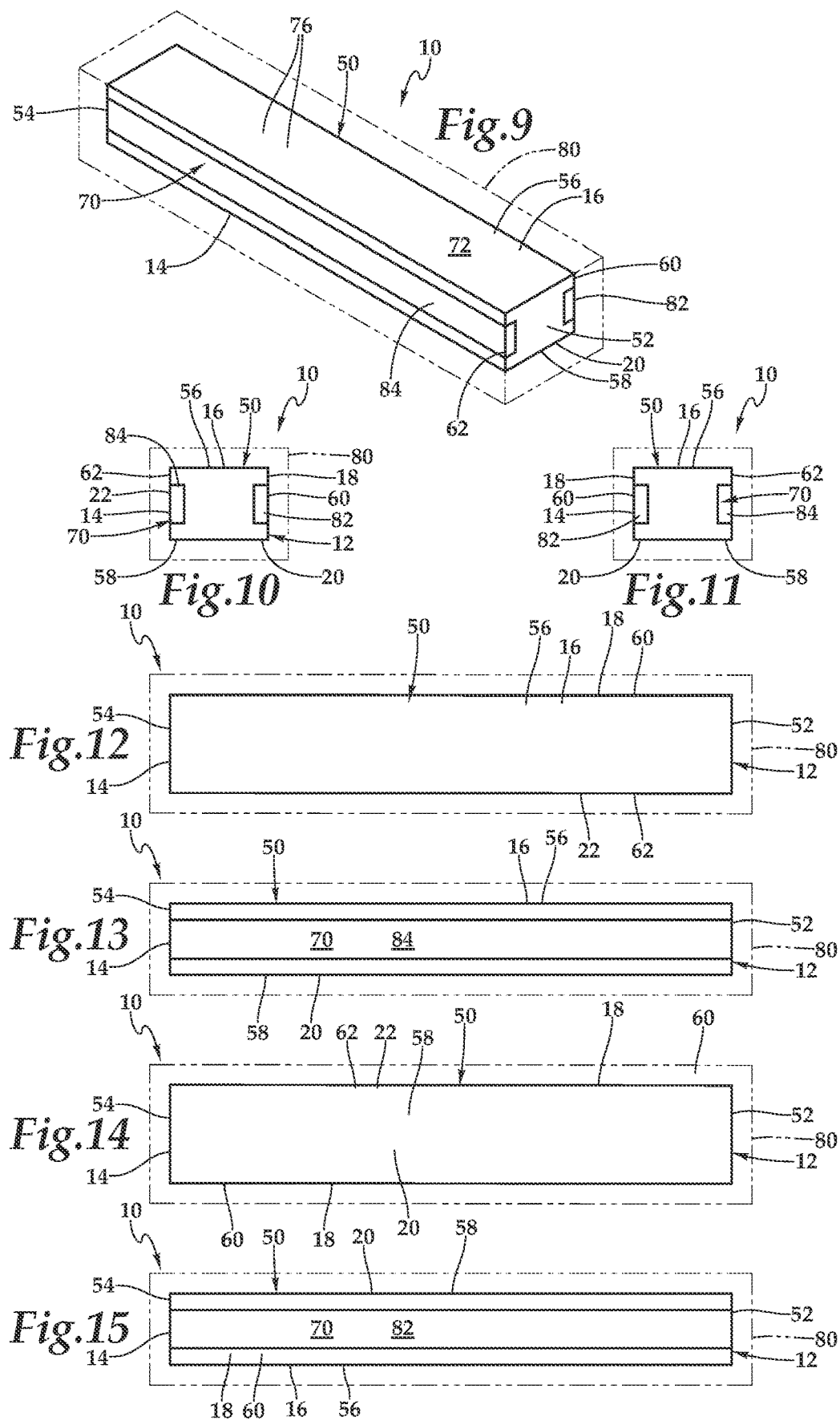

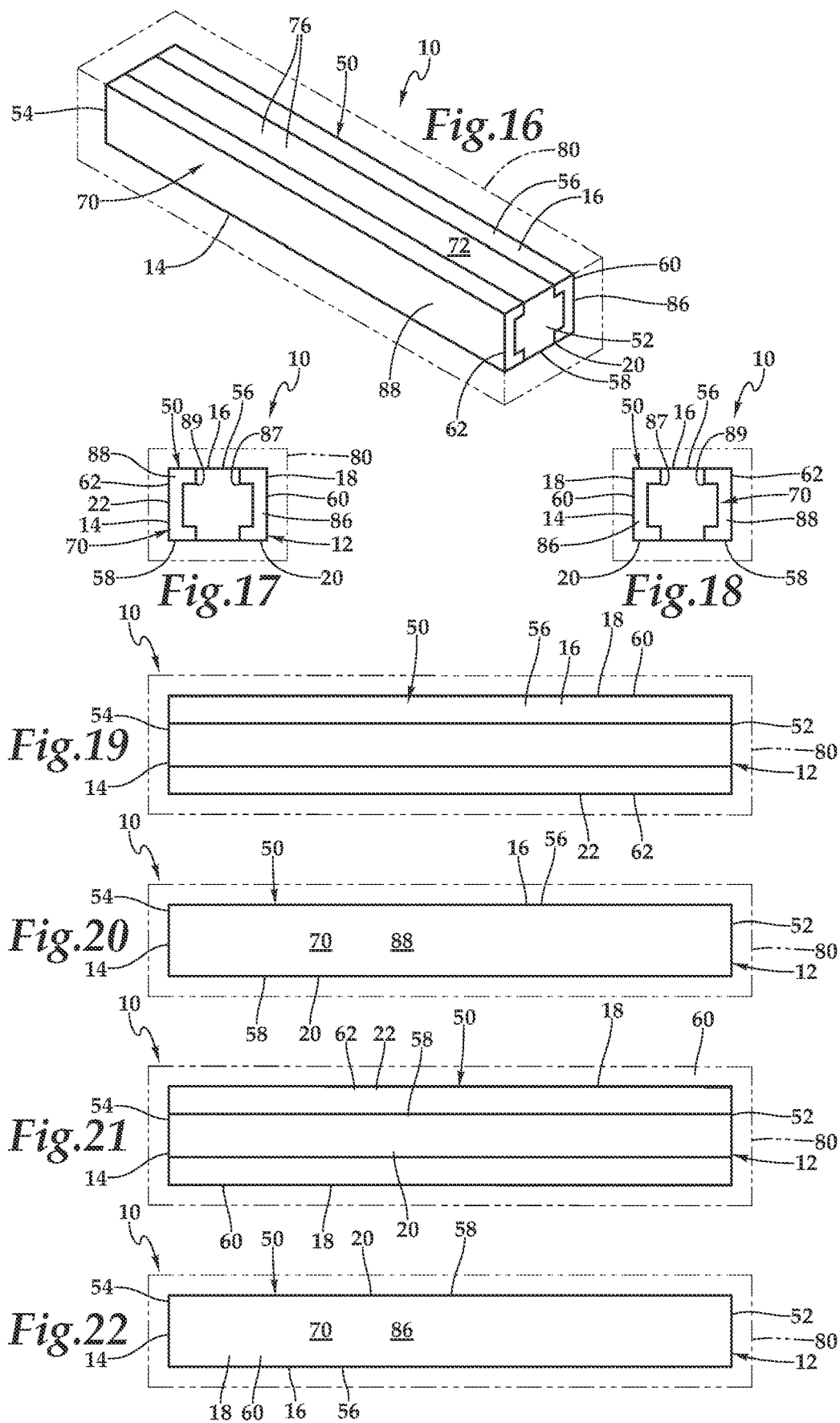

CARPET WASTE COMPOSITE AND METHOD FOR MAKING SAME

PRIORITY STATEMENT & CROSS-REFERENCE TO RELATED APPLICATIONS

This application claims the benefit of U.S. Provisional Application Ser. No. 63/378,388 entitled "Carpet Waste Composite and Method for Making Same" and filed on Oct. 5, 2022 in the name of Daniel R. McIntyre; which is hereby incorporated by reference, in entirety, for all purposes. This application is also a continuation-in-part of U.S. application Ser. No. 17/713,712 entitled "Carpet Waste Composite and Method for Making Same" and filed on Apr. 5, 2022 in the name of Daniel R. McIntyre, now U.S. Pat. No. 11,648,748 and issued on May 16, 2023; which is a continuation of U.S. application Ser. No. 17/162,839 entitled "Carpet Waste Composite and Method for Making Same" and filed on Jan. 29, 2021 in the name of Daniel R. McIntyre, now U.S. Pat. No. 11,292,230, issued on Apr. 5, 2022; which claims the benefit of U.S. Provisional Application Ser. No. 62/967,893 entitled "Carpet Waste Composite and Method for Making Same" and filed on Jan. 30, 2020. U.S. patent application Ser. No. 17/162,839 is also a continuation-in-part of U.S. application Ser. No. 16/774,750 entitled "Carpet Waste Composite and Method for Making Same" and filed on Jan. 28, 2020 in the name of Daniel R. McIntyre, now U.S. Pat. No. 10,981,354, issued on Apr. 20, 2021; which is a continuation of U.S. application Ser. No. 16/528,332 entitled "Carpet Waste Composite and Method for Making Same" and filed on Jul. 31, 2019 in the name of Daniel R. McIntyre, now U.S. Pat. No. 10,611,121, issued on Apr. 7, 2020; which claims priority from U.S. Application Ser. No. 62/715,401 entitled "Carpet Waste Composite and Method for Making Same" and filed on Aug. 7, 2018 in the name of Daniel R. McIntyre; all of which are hereby incorporated by reference, in entirety, for all purposes.

TECHNICAL FIELD OF THE INVENTION

This invention relates, in general, to composites and, in particular, to carpet waste composites and a method for making the same that are used in various industrial, construction, and consumer applications requiring tensile strength and resistance to environmental factors including ultraviolet light and insects, for example.

BACKGROUND OF THE INVENTION

With increased emphasis on recycling and re-use, attention has turned to alternatives to disposing of carpet waste in landfills, whether the carpet waste is a result of new carpet production or post-consumer use. As composites may be used in various industrial, construction, and consumer applications requiring tensile strength and resistance to environmental factors including ultraviolet light and insects, for example, efforts are focused on diverting carpet waste from landfills and utilizing the carpet waste in the production of composites. In fact, some studies indicate as much as six billion pounds of carpet waste may be deposited in landfills in the United States each year. A need exists for carpet waste composites with acceptable performance that may be efficiently and effectively manufactured.

SUMMARY OF THE INVENTION

It would be advantageous to achieve a carpet waste-based composite that performs in various industrial, construction, and consumer applications. It would also be desirable to enable a thermomechanical solution that furnishes an efficient process for the production of composites with carpet waste sourced from landfill diversion and new carpet production. To better address one or more of these concerns, in one aspect of the invention, a carpet waste composite and method for making the same are disclosed. In one embodiment of the method, cleaned, unadulterated layers of carpet are provided. An initial, unfused carpet layer is made by placing two cleaned, unadulterated layers of carpet tufted side-to-tufted side with homogenous and adhesive contact therebetween. Heat and pressure followed by cooling are applied to furnish an initial, fused carpet layer. Carpet layers are iteratively added, as required, using heat and pressure followed by cooling to furnish a carpet waste composite. Plates are added in sealing engagement to surfaces of the composite construction material. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic diagram depicting one embodiment of a carpet waste composite manufactured from carpet waste, according to the teachings presented herein;

FIG. 2 is a perspective view, in partial cutaway, depicting one embodiment of the carpet waste composite;

FIG. 3 is a front elevation view, in partial cutaway, depicting the carpet waste composite of FIG. 2;

FIG. 4 is a rear elevation view, in partial cutaway, depicting the carpet waste composite of FIG. 2;

FIG. 5 is a top plan view, in partial cutaway, depicting the carpet waste composite of FIG. 2;

FIG. 6 is a right side elevation view, in partial cutaway, depicting the carpet waste composite of FIG. 2;

FIG. 7 is a bottom plan view, in partial cutaway, depicting the carpet waste composite of FIG. 2;

FIG. 8 is a left side elevation view, in partial cutaway, depicting the carpet waste composite of FIG. 2;

FIG. 9 is a perspective view, in partial cutaway, depicting another embodiment of the carpet waste composite;

FIG. 10 is a front elevation view, in partial cutaway, depicting the carpet waste composite of FIG. 9;

FIG. 11 is a rear elevation view, in partial cutaway, depicting the carpet waste composite of FIG. 9;

FIG. 12 is a top plan view, in partial cutaway, depicting the carpet waste composite of FIG. 9;

FIG. 13 is a right side elevation view, in partial cutaway, depicting the carpet waste composite of FIG. 9;

FIG. 14 is a bottom plan view, in partial cutaway, depicting the carpet waste composite of FIG. 9;

FIG. 15 is a left side elevation view, in partial cutaway, depicting the carpet waste composite of FIG. 9;

FIG. 16 is a perspective view, in partial cutaway, depicting a further embodiment of the carpet waste composite;

FIG. 17 is a front elevation view, in partial cutaway, depicting the carpet waste composite of FIG. 16;

FIG. 18 is a rear elevation view, in partial cutaway, depicting the carpet waste composite of FIG. 16;

FIG. 19 is a top plan view, in partial cutaway, depicting the carpet waste composite of FIG. 16;

FIG. 20 is a right side elevation view, in partial cutaway, depicting the carpet waste composite of FIG. 16;

FIG. 21 is a bottom plan view, in partial cutaway, depicting the carpet waste composite of FIG. 16;

FIG. 22 is a left side elevation view, in partial cutaway, depicting the carpet waste composite of FIG. 16;

DETAILED DESCRIPTION OF THE INVENTION

Figure 23:
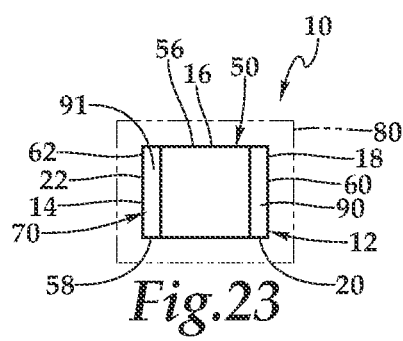
FIG. 23 is a front elevation view, in partial cutaway, depicting a still further embodiment of the carpet waste composite.
Figure 24:
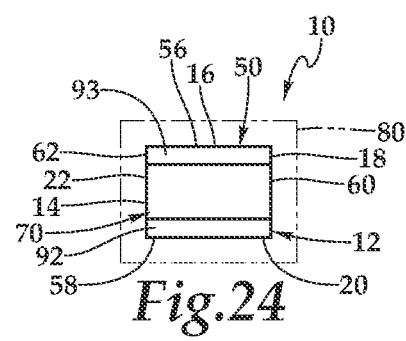
FIG. 24 is a front elevation view, in partial cutaway, depicting an even further embodiment of the carpet waste composite.
Figure 25:
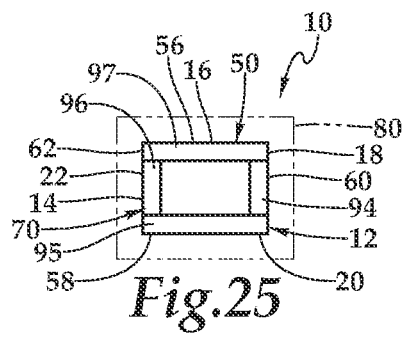
FIG. 25 is a front elevation view, in partial cutaway, depicting an even still further embodiment of the carpet waste composite.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, therein is depicted one embodiment of a carpet waste composite, which is schematically illustrated and generally designated 10. The carpet waste composite 10 is shown as a rectangular support member 12 having a body 14 with sides 16, 18, 20, 22 and ends 24, 26. Although the carpet waste composite 10 is depicted as a rectangular support member 12, it should be appreciated that the carpet waste composite 10 may take any form for various industrial, construction, and consumer applications. The carpet waste composite 10 may be used as a rail tie, a crossing tie, or in another rail application. Additionally, the carpet waste composite 10 may be utilized in various construction applications needing deck supports, bridge supports, beams, and other support members. Further, it should be appreciated that although the carpet waste composite 10 is depicted as having a rectangular shape, the form may vary and be engineered, shaped, and angled according to the needs of the particular application.

The carpet waste composite 10 is manufactured from carpet waste 30, which may be sourced from landfill diversion or new carpet production, for example. In one embodiment, the carpet waste 30 includes a backing side 32 having a tufted side 34 extending therefrom. The backing side 32 may include a primary backing fabric 36 and a secondary backing fabric 38 with a binding agent 40 bonding the primary backing fabric 36 to the secondary backing fabric 38. As depicted, the primary backing fabric 36 of the backing side 32 is located in contact with the tufted side 34. The backing side 32 provides tuft-binds for securing the tufted side 34 to the carpet, which ensures imperviousness to moisture and resistance to edge raveling. The tufted side 34 includes face yarns 42 and offers carpet characteristics such as durability, abrasion resistance, texture retention, stain and soil resistance, colorfastness, ease of cleaning, and color clarity, for example.

The carpet waste 30 may be sourced from various carpets, such as polypropylene carpets, nylon 6 carpets, nylon 6,6 carpets, and polyester carpets, or combinations thereof, for example. The vast majority of carpets manufactured in the United States are tufted carpets and of all tufted carpets, the vast majority are manufactured with thermoplastic face yarns. Major face yarn types currently used in the manufacture of tufted carpets are nylon yarns, normally composed of poly(epsilon-caprolactam) or poly(hexamethylene adipamide), also known as nylon-6 and nylon 6,6, respectively; propylene polymer yarns, typically composed of propylene homopolymer; and polyester yarns, normally composed of polyethylene terephthalate. Primary backings for tufted carpets are typically woven fabrics made of synthetic yarns, although nonwoven fabrics can also be used. The most common synthetic material used in primary backing fabrics is polypropylene, although polyesters also find use in the industry. Again, it will be appreciated that the vast majority of backings for tufted carpets are manufactured from thermoplastics. The carpet finishing operation typically involves application of a latex binder (typically a filled thermoset resin emulsion) and a secondary backing fabric. The material most typically used for carpet back coating is styrene butadiene latex (SBR), usually a carboxylated SBR. The overwhelming majority of tufted carpet today is finished by laminating a secondary backing fabric to the tufted primary backing fabric with a latex.

Referring to FIG. 2 through FIG. 8, the rectangular support member 12 has the body 14 with sides 16, 18, 20, 22, that in this implementation define a rail tie 50. It should be appreciated, however, that as previously discussed, the form of the rectangular support member 12 may vary with application and is fully customizable to a variety of form factors. The rail tie 50 includes a front end 52, a rear end 54, and an upper, a lower and two lateral longitudinally elongated side surfaces 56, 58, 60, 62 extending from the front end 52 to the rear end 54. In some embodiments, the carpet waste composite 10 includes a reinforcement structure 70. More particularly, in the embodiment shown in FIG. 2 through FIG. 8, the reinforcement structure 70 includes a plate 72 in sealing engagement with the upper longitudinally elongated side surface 56 and a plate 74 in sealing engagement with the lower longitudinally elongated side surface 58. As shown, in some embodiments, reinforcement rods 76 traverse the body 14 from the plate 72 to the plate 74. In this embodiment, the plates 72, 74 and the reinforcement rods 76 provide a reinforcement structure shown as trellis 68 integrated into the composite construction material 12.

In some embodiments, at least a portion of the reinforcement structure 70 includes fiberglass. By way of example, and not by way of limitation, the plates 72, 74 may be fiberglass plates. It should be appreciated, however, that materials other than fiberglass are within the teachings of the present invention. In some embodiments, the composite construction material 10 includes iteratively added layers of carpet 80 that are positioned exterior to the reinforcement structure 60 to provide a more finished product. Referring now to FIG. 9 through FIG. 15, in some embodiments, the reinforcement structure 70 includes a plate 82 in sealing engagement with the lateral elongated side surface 60 and a plate 84 in sealing engagement with the lower longitudinally elongated side surface 62.

Figure 26:
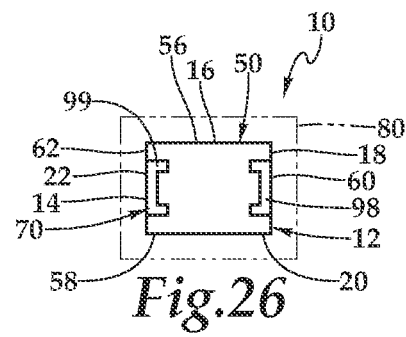
FIG. 26 is a front elevation view, in partial cutaway, depicting an additional embodiment of the carpet waste composite.

Referring now to FIG. 16 through FIG. 22, in some embodiments, the reinforcement structure 70 includes a plate 86 having a c-shape 87 in sealing engagement with the lateral elongated side surface 60 and a plate 88 having a c-shape 89 in sealing engagement with the lower longitudinally elongated side surface 62. Referring now to FIG. 23, FIG. 24, FIG. 25, and FIG. 26, various embodiments of the reinforcement structure 70 include parallel vertical plates 90, 91 (FIG. 23), parallel horizontal plates 92, 93 (FIG. 24), four plates 94, 95, 96, 97 forming a box (FIG. 25), and small c-shaped plates 98, 99 (FIG. 26). It should be appreciated by the various nonlimiting examples presented herein, that the placement and form of the reinforcement structure 70 within the carpet waste composite 10 may vary depending on the engineering and material sciences application being undertaken.

Figure 27:
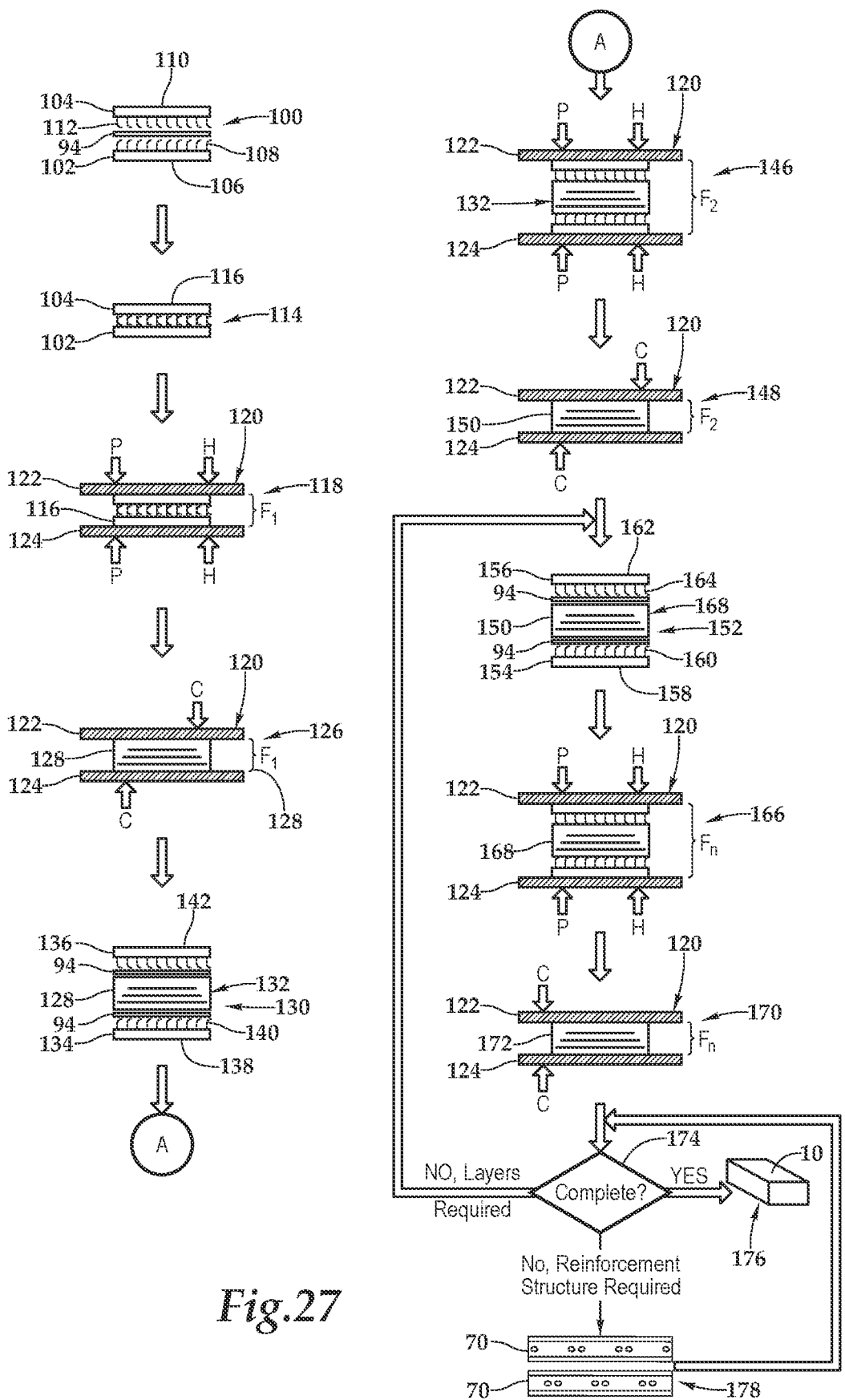
FIG. 27 is a schematic flow chart depicting one embodiment of a method for making a carpet waste composite according to the teachings presented herein.

Referring to FIG. 27, therein is depicted one embodiment of a method for making the carpet waste composite 10 utilizing an adhesive material 94. By way of example and not by way of limitation, the adhesive material 94 may be a urethane adhesive. In another implementation, the adhesive material 94 may be a urethane adhesive derived from a PET polyol reacted with an isocyanate. In still another implementation, the adhesive material 94 may include or be a fire retardant. In a still further implementation, the adhesive material 94 may include an epoxy, melamine, formaldehyde, or a combination thereof, with or without the aforementioned urethane adhesive. As discussed, the adhesive material 94 may be any adhesive suitable for adhesion and bonding properties discussed herein and the adhesive material 94 selected will depend on the intended application or applications of the carpet waste composite 10.

At block 100, a supply of cleaned, unadulterated layers of carpet 102, 104 are provided, which in one embodiment includes the aforementioned carpet waste composite 10. Although cleaned, unadulterated layers of carpet 102, 104 are provided, it should be appreciated that the supply of carpet may be uncleaned and adulterated. The supply of cleaned, unadulterated layers of carpet 102, 104 may be the same type of carpet or different types of carpet. That is, the systems and methods presented herein may be utilized with mixed carpet stock. The cleaned, unadulterated layer of carpet 102 includes a backing side 106 and a tufted side 108. In one implementation, the backing side 106 is not separated from the tufted side 108. That is, the cleaned, unadulterated layer of carpet 102 may be unseparated. Further, the cleaned, unadulterated layer of carpet 102 may be unshredded and without grinding as unground. In one embodiment, intact carpet that is unseparated, unshredded, and unground is utilized. The cleaned, unadulterated layer of carpet 104 includes a backing side 110 and a tufted side 112. In one implementation the backing side 110 is not separated from the tufted side 112. That is, the cleaned, unadulterated layer of carpet 104 may be unseparated. Further, the cleaned, unadulterated layer of carpet 104 may be unshredded and without grinding as unground. As previously mentioned, the cleaned, unadulterated layers of carpet 102, 104 may be sourced from various carpets, such as aforementioned polypropylene carpets, nylon 6 carpets, nylon 6,6 carpets, and polyester carpets, or combinations thereof, for example. The cleaned, unadulterated layers of carpet 102, 104 may be carpet waste 30 that is sourced from landfill diversion or scraps and remainder pieces from new carpet production. The cleaned, unadulterated layers of carpet 102, 104 may be cleaned by a thorough combing and vacuuming to remove any debris. In one embodiment, during the cleaning process, additional compounds and chemicals are not added, so that the cleaned, unadulterated layers of carpet 102, 104 remain unadulterated.

At block 114, the cleaned, unadulterated layers of carpet 102, 104 are positioned tufted side-to-tufted side with homogenous and adhesive contact, provided by the adhesive material 94, therebetween. At block 114, an initial, unfused carpet layer 116 is created by placing the cleaned, unadulterated layers of carpet 102, 104 tufted side-to-tufted side with homogenous and adhesive contact therebetween.

At block 118, heat H and pressure P are applied to the initial, unfused carpet layer 116 within a carrier 120 having vertically spaced plates 122, 124 at a fixed height $F_1$. By way of example and not by way of limitation, the vertically spaced plates 122, 124 may comprise aluminum plates. Further, the heat H and pressure P operations may be executed by a heated conveyor.

In one embodiment, the fixed height $F_1$ may be a distance from 80 thousandths of an inch (0.20 cm) to 280 thousandths of an inch (0.71 cm). Additionally, the fixed height $F_1$ may be a distance from 130 thousandths of an inch (0.33 cm) to 230 thousandths of an inch (0.58 cm). In a further embodiment, the fixed height $F_1$ may be 180 thousandths of an inch (0.46 cm). The heat H applied may be between 200° F. (102° C.) and 800° F. (426° C.), in one embodiment. In another embodiment, the heat H applied may be between 250° F. (121° C.) and 450° F. (232° C.), in one embodiment. In still another embodiment, the heat H applied may be 350° F. (176° C.). The pressure P applied may be a continuous physical force to hold the initial, unfused carpet layer 116 at the fixed height $F_1$. In one implementation the continuous physical force may squeeze the initial, unfused carpet layer 116 at the fixed height $F_1$.

At block 126, cooling C is applied to the initial, unfused carpet layer 116 to form an initial, fused carpet layer 128 within a carrier 120 having vertically spaced plates 122, 124 at a fixed height $F_1$. By way of example and not by way of limitation, the vertically spaced plates 122, 124 may comprise aluminum plates or steel plates. By way of example and not by way of limitation, the cooling C operations may be executed by a cooling conveyor. In one embodiment, the cooling C applied may be a temperature at 35° F. (1.7° C.) to 100° F. (37° C.). In another embodiment, the cooling C applied may be 42° F. (5.6° C.). The cooling C may be applied thermomechanically or by ambient conditions, for example.

At block 130, an iterative, unfused carpet layer 132 is created by placing cleaned, unadulterated layers of carpet 134, 136 tufted side-to-tufted side with the initial, fused carpet layer 128 interposed therebetween. The cleaned, unadulterated layer of carpet 134 includes a backing side 138 and a tufted side 140. The cleaned, unadulterated layer of carpet 136 includes a backing side 142 and a tufted side 144. As previously mentioned, the cleaned, unadulterated layers of carpet 134, 136 may be sourced from various carpets, such as aforementioned polypropylene carpets, nylon 6 carpets, nylon 6,6 carpets, and polyester carpets, or combinations thereof, for example. The cleaned, unadulterated layers of carpet 134, 136 may be carpet waste 30 that is sourced from landfill diversion or scraps and remainder pieces from new carpet production. The cleaned, unadulterated layers of carpet 134, 136 may be cleaned by a thorough combing and vacuuming to remove any debris. During the cleaning process, additional compounds and chemicals are not added, so that the cleaned, unadulterated layers of carpet 134, 136 remain unadulterated.

Continuing with block 130, the cleaned, unadulterated layers of carpet 134, 136 are positioned tufted side-to-tufted side with homogenous and adhesive contact, provided by the adhesive material 144, with the initial, fused carpet layer 128 therebetween. At block 146, heat H and pressure P are applied to the iterative, unfused carpet layer 132 within the carrier 120 having the vertically spaced plates 122, 124 with a fixed height $F_2$. The fixed height $F_2$ may be greater than the fixed height $F_1$. In the illustrated embodiment, the carrier 120 in block 146 is identical to the carrier 120 in block 188. It should be appreciated that the carriers may be different in other implementations. By way of example and not by way of limitation, the heat H and pressure P operations may be executed by the heated conveyor as previously described.

In one embodiment, the fixed height $F_2$ may be a distance that is twice the fixed height $F_1$. That is, the fixed height $F_2$ may be a distance from 160 thousandths of an inch (0.41 cm) to 560 thousandths of an inch (1.42 cm). Additionally, the fixed height $F_2$ may be a distance from 260 thousandths of an inch (0.66 cm) to 460 thousandths of an inch (1.17 cm). In a further embodiment, the fixed height $F_2$ may be 360 thousandths of an inch (0.91 cm). The heat H applied may be between 400° F. (204° C.) and 800° F. (426° C.) in one embodiment. In another embodiment, the heat H applied may be 600° F. (315° C.). The pressure P applied may be a continuous physical force to hold the iterative, unfused carpet layer 82 at the fixed height $F_2$.

At block 148, cooling C is applied to the iterative, unfused carpet layer 132 to form an incremental, fused carpet layer 150. By way of example and not by way of limitation, the cooling C operations may be executed by the cooling conveyor as previously described. In one embodiment, the cooling C applied may be a temperature at 35° F. (1.7° C.) to 100° F. (37° C.). In another embodiment, the cooling C applied may be 42° F. (5.6° C.).

At block 152, a further incremental, unfused carpet layer 168 is created by placing cleaned, unadulterated layers of carpet 154, 156 tufted side-to-tufted side with the incremental, fused carpet layer 150 interposed therebetween with the adhesive material 94 providing the adhesive contact. The cleaned, unadulterated layer of carpet 154 includes a backing side 158 and a tufted side 160. The cleaned, unadulterated layer of carpet 156 includes a backing side 162 and a tufted side 164. As previously mentioned, the cleaned, unadulterated layers of carpet 154, 156 may be sourced from various carpets, such as aforementioned polypropylene carpets, nylon 6 carpets, nylon 6,6 carpets, and polyester carpets, or combinations thereof, for example. The cleaned, unadulterated layers of carpet 154, 156 may be carpet waste 30 that is sourced from landfill diversion or scraps and remainder pieces from new carpet production. The cleaned, unadulterated layers of carpet 154, 156 may be cleaned by a thorough combing and vacuuming to remove any debris. During the cleaning process, additional compounds and chemicals are not added, so that the cleaned, unadulterated layers of carpet 154, 156 remain unadulterated.

At block 166, heat H and pressure P are applied to the further incremental, unfused carpet layer 168 within the carrier 120 having the vertically spaced plates 122, 124 with a fixed height $F_n$, which may be $F_3$, in instances where a third layer is being manufactured. In general, the fixed height $F_n$ may be greater than the fixed height $F_2$ and the fixed height $F_1$. By way of example and not by way of limitation, the heat H and pressure P operations may be executed by the heated conveyor previously described at the heat H and pressure P conditions previously described. In one embodiment, the fixed height $F_n$ may be n times the fixed height $F_1$. So, when n equals 3, then the fixed height $F_n$ may be $F_{n=3}$, which is 3 times the fixed height $F_1$. Similarly, when n equals 4, then the fixed height $F_n$ may be $F_{n=4}$, which is 4 times the fixed height $F_1$.

At block 170, cooling C is applied to the further incremental, unfused carpet layer 168 to form a further incremental, fused carpet layer 172. By way of example and not by way of limitation, the cooling C operations may be executed by the cooling conveyor previously discussed at the previously discussed cooling C.

At decision block 174, if the carpet waste composite 10 is complete, then the methodology ends at block 176. On the other hand, if additional incremental thickness is required, then the process returns to blocks 152, 166, and 170 to incrementally add another layer and the fixed height $F_n$ increases incrementally. As each layer is added, in one embodiment, the fixed height $F_n$ may incrementally increase by a fixed height equal to the fixed height $F_1$. Further, if reinforcement structure 70 is required, then the process advances to block 178 where, with proper tooling, reinforcement structure 70 is added to the carpet waste composite 10. Tooling for the installation of the reinforcement structure 70 may include, by way of example, a press to design the reinforcement structure 70 including fiberglass reinforced panels in various positions or on various surfaces. The press utilizes heat and pressure with the phenolic resin to exert continuous physical force to shape the panels, which may have the form of plates. The temperature and pressure are variable depending on the time under force in the press. It should be appreciated that a radio wave generator is an alternative to the press for the design of the fiberglass components. Following the addition of the reinforcement structure 70, the methodology returns to the decision block 174, where additional layers may be added over the reinforcement structure 170 via the blocks 152, 166, and 170 or the process may be complete at the block 176.

It should be appreciated that variations in the methodology of FIG. 16 are within the teachings presented herein. By way of example and not by way of limitation, the layers of carpet may be positioned tufted side-to-backing side or backing side-to-backing side at various stages in the methodology. That is, the layers of carpet may be positioned side-to-side, including tufted side-to-tufted side, tufted side-to-backing side, backing side-to-tufted side, or backing side-to-backing side. Further, at block 100 or another block, multiple layers of carpet, such as four, may be used initially or at other stages of the methodology to create the unfused carpet layer.

As mentioned, it should be appreciated that variations in the methodology of FIG. 16 are within the teachings presented herein. By way of further example, the cleaned, unadulterated layers of carpet may include by weight percent, 1% to 5% of additives. Also as mentioned, the layers of carpet may include adhesive and binding contact therebetween provided by an adhesive material 94, including various binders, by weight percent, of 5% to 50%. More particularly, the adhesive material 94 may comprise between 10% and 30%, by weight, of the carpet waste composite 10. By way of another example, the cleaned, unadulterated layers of carpet may be positioned side-to-side with non-homogenous and selective adhesive contact therebetween.

Figure 28A:
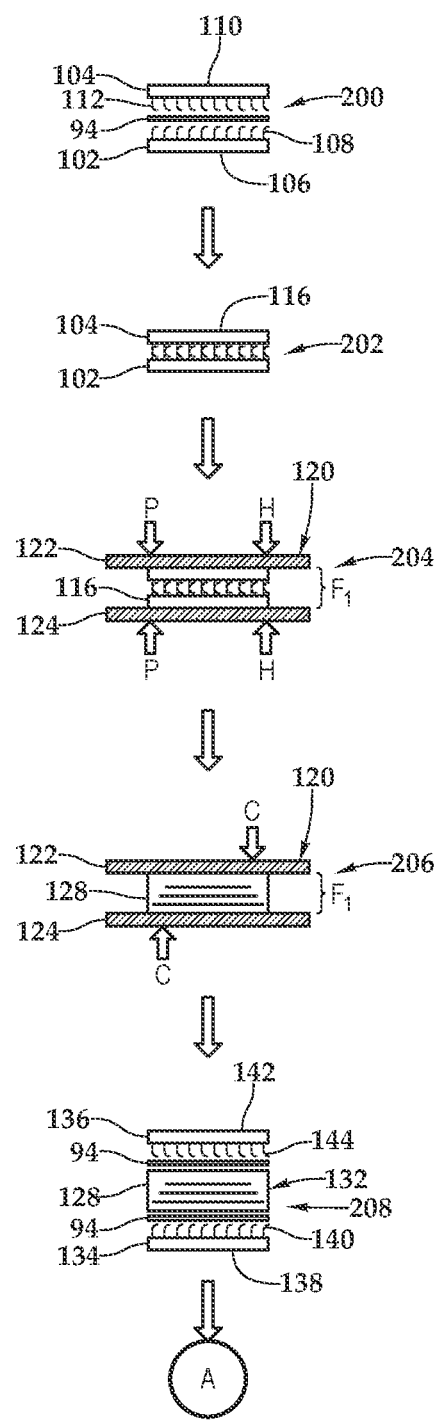
FIGS. 28A and 28B, together, are a schematic flow chart depicting another embodiment of a method for making a carpet waste composite according to the teachings presented herein.
Figure 28B:
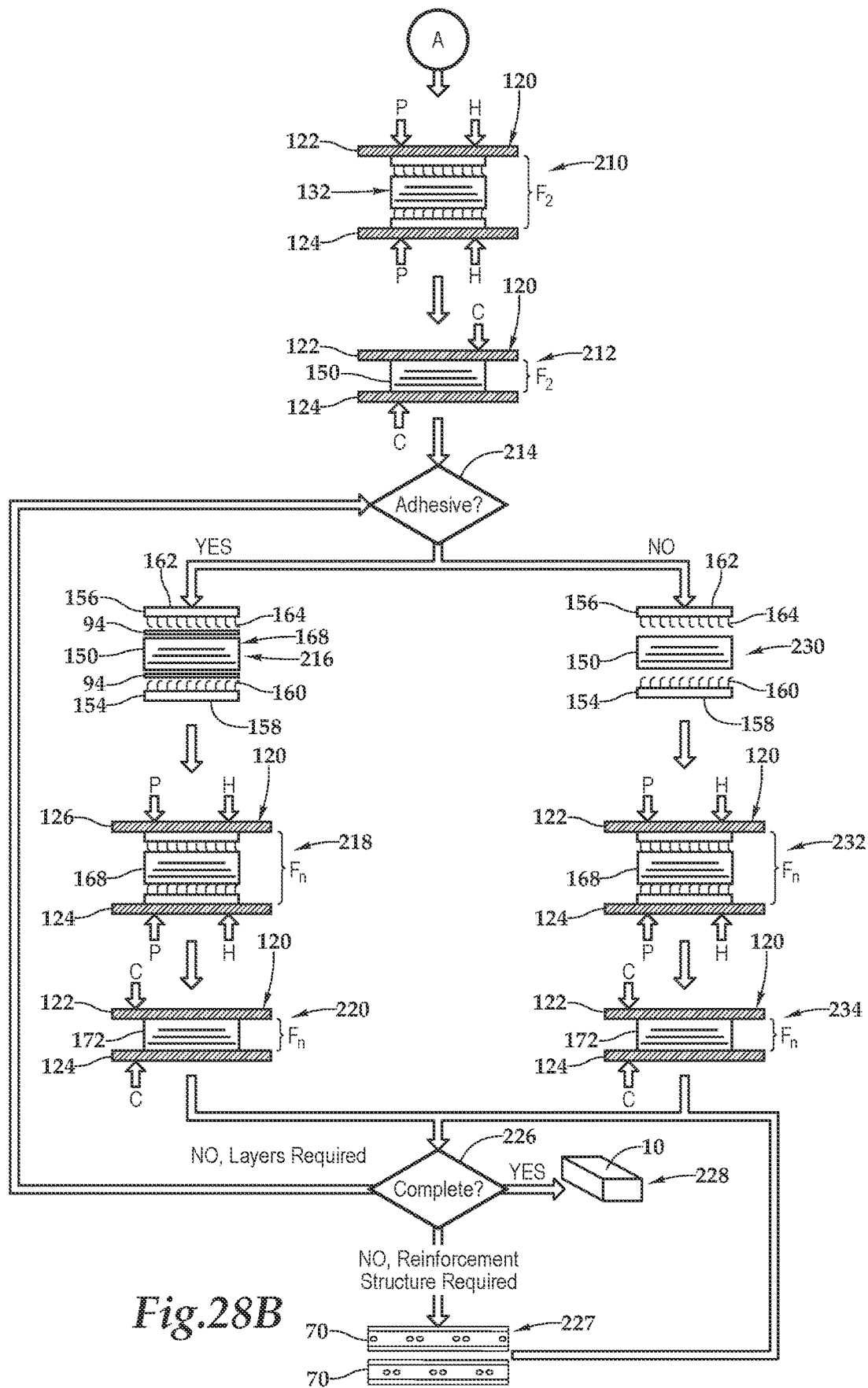

Referring to FIGS. 28A and 28B, therein is depicted one embodiment of a method for making the carpet waste composite 10 selectively utilizing the adhesive material 94, including various binders, for example. In the embodiment presented in FIGS. 28A and 28B, the adhesive material 94 is selectively utilized for certain layers of carpet in accordance with strength and weight demands of the application. The adhesive material 94 may be used in a single layer or in multiple layers. In the embodiment shown in FIGS. 28A and 28B, the adhesive material 94 is utilized in the initial layer and in the iterative layers as needed. By way of example and not by way of limitation, the heat H and pressure P operations as well as the cooling C operations may be executed in a manner similar to that described in FIG. 2.

At block 200, the supply of cleaned, unadulterated layers of carpet 102, 104 are provided, which in one embodiment includes the aforementioned carpet waste composite 10. Although the cleaned, unadulterated layers of carpet 102, 104 are provided, it should be appreciated that the supply of carpet may be uncleaned and adulterated. The supply of cleaned, unadulterated layers of carpet 102, 104 may be the same type of carpet or different types of carpet. That is, the systems and methods presented herein may be utilized with mixed carpet stock. The cleaned, unadulterated layer of carpet 102 includes the backing side 106 and the tufted side 108. The cleaned, unadulterated layer of carpet 104 includes the backing side 110 and the tufted side 112. At block 200, the cleaned, unadulterated layers of carpet 102, 104 are positioned tufted side-to-tufted side with homogenous and adhesive contact, provided by the adhesive material 94, therebetween. At block 202, the initial, unfused carpet layer 166 is created by placing the cleaned, unadulterated layers of carpet 102, 104 tufted side-to-tufted side with homogenous and adhesive contact therebetween. At block 204, heat H and pressure P are applied to the initial, unfused carpet layer 116 within a carrier 120 having vertically spaced plates 122, 124 at a fixed height $F_1$.

At block 206, cooling C is applied to the initial, unfused carpet layer 116 to form an initial, fused carpet layer 128. At block 208, an iterative, unfused carpet layer 132 is created by placing cleaned, unadulterated layers of carpet 134, 136 tufted side-to-tufted side with the initial, fused carpet layer 128 interposed therebetween. The cleaned, unadulterated layer of carpet 134 includes the backing side 138 and the tufted side 140. The cleaned, unadulterated layer of carpet 136 includes the backing side 142 and the tufted side 144. At block 208, the cleaned, unadulterated layers of carpet 134, 136 are positioned tufted side-to-tufted side with homogenous and non-adhesive contact therebetween. At block 210, heat H and pressure P are applied to the iterative, unfused carpet layer 132 within the carrier 120 having the vertically spaced plates 122, 124 with a fixed height $F_2$. The fixed height $F_2$ may be greater than the fixed height $F_1$. In the illustrated embodiment, the carrier 120 in block 210 is identical to the carrier 120 in block 154. It should be appreciated that the carriers may be different in other implementations.

At block 212, cooling C is applied to the iterative, unfused carpet layer 132 to form an incremental, fused carpet layer 150. At decision block 214, subsequent incremental carpet layers may be created with or without the use of adhesive. If adhesive is selected, at block 216, a further incremental, unfused carpet layer 118 is created by placing cleaned, unadulterated layers of carpet 154, 156 tufted side-to-tufted side with the incremental, fused carpet layer 150 interposed therebetween with the adhesive material 94 providing the adhesive contact. The cleaned, unadulterated layer of carpet 154 includes the backing side 158 and the tufted side 160. The cleaned, unadulterated layer of carpet 106 includes the backing side 162 and the tufted side 164.

At block 218, heat H and pressure P are applied to the further incremental, unfused carpet layer 168 within the carrier 120 having the vertically spaced plates 122, 124 with a fixed height $F_n$, which may be $F_3$ in instances where a third layer is being manufactured. In general, the fixed height $F_n$ may be greater than the fixed height $F_2$ and the fixed height $F_1$. In one embodiment, the fixed height $F_n$ may be n times the fixed height $F_1$. So, when n equals 3, then the fixed height $F_n$ may be $F_{n=3}$, which is 3 times the fixed height $F_1$. Similarly, when n equals 4, then the fixed height $F_n$ may be $F_{n=4}$, which is 4 times the fixed height $F_1$. At block 170, cooling C is applied to the further incremental, unfused carpet layer 168 to form a further incremental, fused carpet layer 172.

At decision block 226, if the carpet waste composite 10 is complete, then the methodology ends at block 228. On the other hand, if additional incremental thickness is required, then the process returns to decision block 214. As mentioned, at decision block 214, if an incremental carpet layer is needed with adhesive, then the methodology returns to blocks 216, 218, and 220. On the other hand, at the decision block 214, if an incremental carpet layer is needed without adhesive, then the methodology advances to block 230. Returning to decision block 226, if reinforcement structure 70 is required, then the process advances to block 227 where, with proper tooling, reinforcement structure 70 is added to the carpet waste composite 10. Tooling for the installation of the reinforcement structure 70 may include, by way of example, a press to design the reinforcement structure including fiberglass reinforced panels in various positions or on various surfaces. The press utilizes heat and pressure with the phenolic resin to exert continuous physical force to shape the panels, which may have the form of plates. The temperature and pressure are variable depending on the time under force in the press. It should be appreciated that a radio wave generator is an alternative to the press for the design of the fiberglass components. The adhesive application was utilized to secure the reinforcement structure 70. Following the addition of the reinforcement structure 70, the methodology returns to the decision block 226, where additional layers may be added over the reinforcement structure 170 or the process may be complete at the block 228.

If an adhesive is not selected, at block 230, a further incremental, unfused carpet layer 168 is created by placing cleaned, unadulterated layers of carpet 154, 156 tufted side-to-tufted side with the incremental, fused carpet layer 150 interposed therebetween with homogenous and non-adhesive, non-binding contact therebetween. The cleaned, unadulterated layer of carpet 154 includes the backing side 158 and the tufted side 160. The cleaned, unadulterated layer of carpet 156 includes the backing side 162 and the tufted side 164.

At block 232, heat H and pressure P are applied to the further incremental, unfused carpet layer 168 within the carrier 120 having the vertically spaced plates 122, 124 with a fixed height $F_n$, which may be $F_3$ in instances where a third layer is being manufactured. In general, the fixed height $F_n$ may be greater than the fixed height $F_2$ and the fixed height $F_1$. In one embodiment, the fixed height $F_n$ may be n times the fixed height $F_1$. So, when n equals 3, then the fixed height $F_n$ may be $F_{n=3}$ may be 3 times the fixed height $F_1$. Similarly, when n equals 4, then the fixed height $F_n$ may be $F_{n=4}$ may be 4 times the fixed height $F_1$. At block 234, cooling C is applied to the further incremental, unfused carpet layer 168 to form a further incremental, fused carpet layer 172. The process then advances to the previously discussed decision block 226.

It should be appreciated that as each layer is added, in one embodiment, the fixed height may incrementally increase by a fixed height equal to the fixed height $F_1$. It should be appreciated that variations in the methodology of FIGS. 17A and 17B are within the teachings presented herein. By way of example and not by way of limitation, the layers of carpet may be positioned tufted side-to-backing side or backing side-to-backing side at various stages in the methodology. That is, the layers of carpet may be positioned side-to-side, including tufted side-to-tufted side, tufted side-to-backing side, backing side-to-tufted side, or backing side-to-backing side. Further, at various steps, multiple layers of carpet, such as four or 10 or 16, may be used initially or at other stages of the methodology to create the unfused carpet layer. The unfused carpet layer may then be bonded together with the adhesive, in some implementations, for utilization in the methodology and manufacturing of the carpet waste composite. By way of another example, the cleaned, unadulterated layers of carpet may be positioned side-to-side with non-homogenous and selective adhesive contact therebetween. By way of further example, the unadulterated layers of carpet may include, by weight percent, 1% to 5% of additives. As mentioned, the layers of carpet may selectively include adhesive and binding contact therebetween provided by an adhesive material 44, including various binders, by weight percent, of 5% to 50%. Furthermore, Portland cement may be utilized as part of, in place of, or in addition to the adhesive to create the bond.

With respect to the adhesive, which may be 5% to 50%, by weight, of the carpet waste composite, or in some implementations, 10% to 30% by weight, of the carpet waste composite, the adhesive may be selected from urethane adhesives, epoxy adhesives, melamine adhesives, and formaldehyde adhesives, for example. Urethan adhesives and, in particular, polyurethane thermosetting adhesives and phenolic glues have particular efficacy. The percent weight of adhesive will depend on how much adhesive is utilized as well as how many layers include the adhesive contact.

Embodiments according to the teachings presented herein will now be illustrated by reference to the following non-limiting working examples wherein procedures and materials are solely representative of those which can be employed, and are not exhaustive of those available and operative. The following glossary enumerates the components utilized in the Examples and Test Methods presented hereinbelow.

Blended carpet is textile floor covering including nylon carpet and polyester carpet.

Fiberglass reinforced panels are thin, flexible plastic panels made of strong polyester resin reinforced with fiberglass.

Fiberglass reinforced rods are cylindrical bars made of strong polyester resin reinforced with fiberglass.

Nylon carpet is a textile floor covering including nylon 6 and nylon 6,6 yarns.

Phenol, including carbolic acid, phenylic acid, and benzophenol, for example, is a class of aromatic organic compounds in which one or more hydroxy groups attached directly to a benzene ring.

Phenolic resin is an adhesive manufactured by Georgia Pacific (Atlanta, Georgia) that includes phenol or derivatives thereof.

Polyester carpet is textile floor covering, including polyester yarns, normally composed of polyethylene terephthalate.

Polyurethane adhesive is adhesive manufactured by Huntsman Corporation (The Woodlands, Texas).

Example I. A carpet waste composite is made from a supply of cleaned, unadulterated layers of polyester carpet. The cleaned, unadulterated layers of polyester carpet were cleaned by a thorough combing and vacuuming to remove any debris. During the cleaning process, additional compounds and chemicals were not added, so that the polyester carpet is unadulterated. For Example I, an adhesive application was prepared such that 30%, by weight, of the adhesive utilized was polyurethane adhesive and 70%, by weight, of the adhesive utilized was phenolic adhesive. The inner layers forming part of a thick core (approximately 1.5" (3.8 cm)) of the carpet waste composite are bonded with the phenolic adhesive and the other layers are bonded with the polyurethane adhesive. In this manner, approximately 70% of the layers are bonded with phenolic adhesive and 30% of the layers are bonded with the polyurethane adhesive.

A composite construction material was formed with seventy-five (75) layers of the polyester carpet by initially placing two layers of the polyester carpet tufted side-to-tufted side with homogenous and adhesive contact within the heated conveyor equipment with a fixed height of 70 thousandths of an inch (0.180 cm) at a heat of 350° F. (176° C.) and pressure of 1300 psi (about 8900 kPa) for 15 minutes. Cooling at 75° F. (23.9° C.) was then applied for 5 minutes. Iteratively, cleaned, unadulterated layers of carpet tufted side-tufted side were added with adhesive contact under the same heat, pressure, and cooling process with an iterative height increase of 141 thousand of inches (0.360 cm). In Example I, the adhesive was 10%, by weight, of the carpet waste composite. In Example I, tooling including a press, was used to design a trellis with fiberglass reinforced panels on the upper and lower surfaces with fiberglass reinforced rods connecting the panels through the carpet waste composite. The press utilizes heat and pressure with the phenolic resin to exert continuous physical force to shape the panels, which may have the form of plates. The temperature and pressure are variable depending on the time under force in the press. It should be appreciated that a radio wave generator is an alternative to the press for the design of the fiberglass components. The adhesive application was utilized to secure the trellis. Additional layers of polyester carpet were applied after the trellis installation.

Example II. A carpet waste composite is made from a supply of cleaned, unadulterated layers of polyester carpet according to the methodology of Example I, except for the addition of the reinforcement structure. In Example II, tooling including a press, was used to design opposing c-shaped plates including fiberglass reinforced panels on the lateral surfaces. The press utilizes heat and pressure with the phenolic resin to exert continuous physical force to shape the panels, which may have the form of plates. The temperature and pressure are variable depending on the time under force in the press. It should be appreciated that a radio wave generator is an alternative to the press for the design of the fiberglass components. The adhesive application was utilized to secure the reinforcement structure. Additional layers of polyester carpet were applied after the reinforcement structure.

Example III. A carpet waste composite is made from a supply of cleaned, unadulterated layers of blended carpet. The cleaned, unadulterated layers of blended carpet was cleaned by a thorough combing and vacuuming to remove any debris. During the cleaning process, additional compounds and chemicals were not added, so that the blended carpet is unadulterated. For Example III, an adhesive application was prepared such that 30%, by weight, of the adhesive utilized was polyurethane adhesive and 70%, by weight, of the adhesive utilized was phenolic adhesive. The inner layers forming part of a thick core (approximately 1.5" (3.8 cm)) of the carpet waste composite are bonded with the phenolic adhesive and the other layers are bonded with the polyurethane adhesive. In this manner, approximately 70% of the layers are bonded with phenolic adhesive and 30% of the layers are bonded with the polyurethane adhesive.

A composite construction material was formed with 35 layers of the blended carpet by initially placing two layers of the blended carpet tufted side-to-tufted side with homogenous and adhesive contact within the heated conveyor equipment with a fixed height of 70 thousandths of an inch (0.180 cm) at a heat of 350° F. (176° C.) and pressure of 1300 psi (about 8900 kPa) for 15 minutes. Cooling at 75° F. (23.9° C.) was then applied for 5 minutes. Iteratively, cleaned, unadulterated layers of carpet tufted side-tufted side were added with adhesive contact under the same heat, pressure, and cooling process with an iterative height increase of 141 thousandths of an inch (0.360 cm). In Example III, the adhesive was 30%, by weight, of the carpet waste composite. In Example III, tooling including a press, was used to design opposing vertical plates including fiberglass reinforced panels on the lateral surfaces. The press utilizes heat and pressure with the phenolic resin to exert continuous physical force to shape the panels, which may have the form of plates. The temperature and pressure are variable depending on the time under force in the press. It should be appreciated that a radio wave generator is an alternative to the press for the design of the fiberglass components. The adhesive application was utilized to secure the reinforcement structure. Additional layers of polyester carpet were applied after the reinforcement structure.

Example IV. A carpet waste composite is made from a supply of cleaned, unadulterated layers of blended carpet. The cleaned, unadulterated layers of blended carpet was cleaned by a thorough combing and vacuuming to remove any debris. During the cleaning process, additional compounds and chemicals were not added, so that the blended carpet is unadulterated. For Example IV, an adhesive application was prepared such that 30%, by weight, of the adhesive utilized was polyurethane adhesive and 70%, by weight, of the adhesive utilized was phenolic adhesive. The inner layers forming part of a thick core (approximately 1.5" (3.8 cm)) of the carpet waste composite are bonded with the phenolic adhesive and the other layers are bonded with the polyurethane adhesive. In this manner, approximately 70% of the layers are bonded with phenolic adhesive and 30% of the layers are bonded with the polyurethane adhesive.

A composite construction material was formed with 20 layers of the blended carpet by initially placing two layers of the blended carpet tufted side-to-tufted side with homogenous and non-adhesive, non-binding contact within the heated conveyor equipment with a fixed height of 70 thousandths of an inch (0.180 cm) at a heat of 350° F. (176° C.) and pressure of 1300 psi (about 8900 kPa) for 15 minutes. Cooling at 75° F. (23.9° C.) was then applied for 5 minutes. Iteratively, cleaned, unadulterated layers of carpet tufted side-tufted side were added with adhesive contact under the same heat, pressure, and cooling process with an iterative height increase of 141 thousandths of an inch (0.360 cm). In Example IV, the adhesive was 46%, by weight, of the carpet waste composite. In Example IV, tooling including a press, was used to design opposing vertical and horizontal plates forming a box including fiberglass reinforced panels on the lateral surfaces. The press utilizes heat and pressure with the phenolic resin to exert continuous physical force to shape the panels, which may have the form of plates. The temperature and pressure are variable depending on the time under force in the press. It should be appreciated that a radio wave generator is an alternative to the press for the design of the fiberglass components. The adhesive application was utilized to secure the reinforcement structure. Additional layers of polyester carpet were applied after the reinforcement structure.

Example V. A carpet waste composite is made from a supply of cleaned, unadulterated layers of blended carpet. The cleaned, unadulterated layers of blended carpet was cleaned by a thorough combing and vacuuming to remove any debris. During the cleaning process, additional compounds and chemicals were not added, so that the blended carpet is unadulterated. For Example V, an adhesive application was prepared such that 30%, by weight, of the adhesive utilized was polyurethane adhesive and 70%, by weight, of the adhesive utilized was phenolic adhesive. The inner layers forming part of a thick core (approximately 1.5" (3.8 cm)) of the carpet waste composite are bonded with the phenolic adhesive and the other layers are bonded with the polyurethane adhesive. In this manner, approximately 70% of the layers are bonded with phenolic adhesive and 30% of the layers are bonded with the polyurethane adhesive.

A composite construction material was formed with initially 10 layers of the blended carpet by initially placing two layers of the blended carpet tufted side-to-tufted side with homogenous and non-adhesive, non-binding contact within the heated conveyor equipment with a fixed height of 70 thousandths of an inch (0.180 cm) at a heat of 350° F. (176° C.) and pressure of 1300 psi (about 8900 kPa) for 15 minutes. Cooling at 75° F. (23.9° C.) was then applied for 5 minutes. Iteratively, cleaned, unadulterated layers of carpet tufted side-tufted side were added with adhesive contact under the same heat, pressure, and cooling process with an iterative height increase of 141 thousandths of an inch (0.360 cm) until the structure was 750 thousandths of an inch (1.905 cm). In Example V, the adhesive was 46%, by weight, of the carpet waste composite. In Example V, tooling including a press, was used to design opposing vertical and horizontal plates forming a box including fiberglass reinforced panels on the lateral surfaces. The press utilizes heat and pressure with the phenolic resin to exert continuous physical force to shape the panels, which may have the form of plates. In Example V, plates having a form of 3.5" (8.89 cm) thick×4.5" (11.43 cm) wide were made. The temperature and pressure are variable depending on the time under force in the press. It should be appreciated that a radio wave generator is an alternative to the press for the design of the fiberglass components. The adhesive application was utilized to secure the reinforcement structure, which was fiberglass/phenolic reinforcement ribs. Additional layers of polyester carpet were applied after the addition of the reinforcement structure.

Test Method I. Four carpet waste composites in accordance with teachings presented herein and manufactured in conformity with each of Example I, Example II, Example III, Example IV, and Example V were tested according to the standard test method for plastic composite cross ties prescribed in the American Railway Engineering and Maintenance-of-way Association (AREMA) Guidance for Plastic Composite Cross Ties. This test method covers the determination of the properties of modules of elasticity, modulus of rupture, rail seat compression, single tie lateral push, spike/screw pullout, and thermal expansion.

By way of brief background, the dimensions for the carpet waste composites manufactured in conformity with each of Example I, Example II, Example III, Example IV, and Example V are for a standard main line wood crossties and as presented in the AREMA specification. The modulus of elasticity (MOE) is the rate of change of unit stress with respect to unit strain under uniaxial loading within the proportional (or elastic) limits of the material. It is a measure of the stiffness of the crosstie, i.e., the relationship between load (stress) and deflection (strain). Values derived from testing of small clear specimens of wood using ASTM International procedure D-143 and U.S. Forest Service data. Actual whole tie values may differ. Unit of measure is pounds per square inch.

Modulus of rupture (MOR) is a measure of the maximum load-carrying capacity or strength of the crosstie and is defined as the stress at which the material breaks or ruptures (based on the assumption that the material is elastic until rupture occurs). Values derived from testing of small clear specimens of wood using ASTM procedure D-143 and U.S. Forest Service data. Actual whole tie values may differ. Unit of measure is pounds per square inch.

The rail seat compression test is a measure of the crushing strength or load-carrying capacity of the crosstie at the rail seat (under the tie plate) and is defined as load per unit area at which compression of the wood occurs. Values derived from testing of small clear specimens of wood using ASTM procedure D-143 and U.S. Forest Service data. Actual whole tie values may differ. Unit of measure is pounds per square inch. The single tie lateral push test is a measure of the lateral resistance of a single crosstie in ballasted track and is representative of the relative resistance of the track to lateral movement in the ballast. Values are based on field tests taken by U.S. Department of Transportation and are based on "minimum" value for consolidated track adjusted to account for differences in density (weight) of the different crosstie wood materials. Unit of measure is pounds.

The spike/screw pullout test defined by AREMA is the force required to remove the fastener (screw or spike) from the tie, which is a measure of the vertical strength of the fastening system. The thermal expansion test as defined by ASTM D696-98 provides a standard test method for coefficients of linear thermal expansion of plastics between −30° C. And 30° C. with a vitreous silica dilatometer.

Table I, Table II, Table III, and Table IV depict the AREMA Guidance for Plastic Composite Cross Ties test results for the Ex. I, Ex. II, Ex. III, Ex. IV, and Ex. V Carpet Waste Composites.

Table I: AREMA Guidance for Plastic Composite Cross Ties Test Results for Select Carpet Waste Composites in accordance with Example I AREMA Guidance for Plastic Composite Cross Ties Example I

| Modulus of Elasticity | Min. - 170,000 psi | PASSED |
|---|---|---|
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - 7.5 x $10^{-5}$ in/in/° F. | PASSED |

Table II: AREMA Guidance for Plastic Composite Cross Ties Test Results for Select Carpet Waste Composites in accordance with Example II AREMA Guidance for Plastic Composite Cross Ties Example II

| Modulus of Elasticity | Min. - 170,000 psi | PASSED |
|---|---|---|
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - 7.5 x $10^{-5}$ in/ in/° F. | PASSED |

Table III: AREMA Guidance for Plastic Composite Cross Ties Test Results for Select Carpet Waste Composites in accordance with Example III AREMA Guidance for Plastic Composite Cross Ties Example III

| Modulus of Elasticity | Min. - 170,000 psi | PASSED |
|---|---|---|
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - 7.5 x $10^{-5}$ in/in/° F. | PASSED |

Table III: AREMA Guidance for Plastic Composite Cross Ties Test Results for Select Carpet Waste Composites in accordance with Example III AREMA Guidance for Plastic Composite Cross Ties Example III

| Modulus of Elasticity | Min. - 170,000 psi | PASSED |
|---|---|---|
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - 7.5 x $10^{-5}$ in/in/° F. | PASSED |

Table IV: AREMA Guidance for Plastic Composite Cross Ties Test Results for Select Carpet Waste Composites in accordance with Example IV AREMA Guidance for Plastic Composite Cross Ties Example IV

| Modulus of Elasticity | Min. - 170,000 psi | PASSED |
|---|---|---|
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - 7.5 x $10^{-5}$ in/in/° F. | PASSED |

Table IV: AREMA Guidance for Plastic Composite Cross Ties Test Results for Select Carpet Waste Composites in accordance with Example V AREMA Guidance for Plastic Composite Cross Ties Example V

| | | |
|---|---|---|
| Modulus of Elasticity | Min. - 170,000 psi | PASSED |
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - 7.5 x $10^{-5}$ in/in/° F. | PASSED |

As shown by the results of Test Method I, the Ex. I, Ex. II, Ex. III, Ex. IV, and Ex. V carpet waste composites exhibited passing performance under the American Railway Engineering and Maintenance-of-way Association (AREMA) Guidance for Plastic Composite Cross Ties, which examined modules of elasticity, modulus of rupture, rail seat compression, single tie lateral push, spike/screw pullout, and thermal expansion. Accordingly, the results of Testing Method I illustrates that the carpet waste composites manufactured in accordance with the teachings presented herein exhibit physical properties that are equivalent or better than those of existing plastic composite rail ties.

The order of execution or performance of the methods and steps illustrated and described herein is not essential, unless otherwise specified. That is, elements of the methods and steps may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method of manufacturing a composite construction material, the method comprising:
providing a plurality of cleaned, unadulterated layers of intact carpet, each of the plurality of cleaned, unadulterated layers of intact carpet having a backing side and a tufted side;
creating an initial, unfused carpet layer by placing two cleaned, unadulterated layers of intact carpet of the plurality of cleaned, unadulterated layers of intact carpet side-to-side with homogenous and adhesive contact therebetween, the homogenous and adhesive contact including an adhesive material;
applying first heat and pressure to the initial, unfused carpet layer within a first carrier having a first fixed height;
applying first cooling to the initial, unfused carpet layer to form an initial, fused carpet layer;
creating the composite construction material by iteratively adding additional layers of cleaned, unadulterated layers of intact carpet of the plurality of cleaned, unadulterated layers of intact contact carpet, each of the additional layers of cleaned, unadulterated layers of intact carpet being added side-to-side with the homogenous and adhesive contact therebetween, each of the additional layers of cleaned, unadulterated layers of intact carpet being subject to an application of second heat and pressure followed by an application of second cooling;
providing first and second plates in a sealing engagement with respective first and second surfaces of the composite construction material; and
providing a plurality of reinforcement rods traversing the composite construction material from the first plate to the second plate.

2. The method as recited in claim 1, wherein creating the composite construction material further comprises creating the composite construction material to provide a generally rectangular member having a front end, a rear end, and an upper, a lower, a first lateral, and a second lateral longitudinally elongated side surfaces extending from the front end to the rear end.

3. The method as recited in claim 2, wherein providing the first and second plates in the sealing engagement with the respective first and second surfaces of the composite construction material further comprises:
providing the first plate in a sealing engagement with the upper longitudinally elongated side surface; and
providing the second plate in a sealing engagement with the lower longitudinally elongated side surface.

4. The method as recited in claim 2, wherein providing first and second plates in the sealing engagement with the respective first and second surfaces of the composite construction material further comprises:
providing the first plate in a sealing engagement with the first lateral longitudinally elongated side surface; and
providing the second plate in a sealing engagement with the second lateral longitudinally elongated side surface.

5. The method as recited in claim 1, wherein the first and second plates further comprise fiberglass plates.

6. The method as recited in claim 1, further comprising creating the composite construction material by iteratively adding further layers of cleaned, unadulterated layers of intact carpet of the plurality of cleaned, unadulterated layers of intact carpet to an exterior of the first and second plates, each of the additional layers of the cleaned, unadulterated layers of intact carpet being added side-to-side with homogenous and adhesive contact therebetween, each of the additional layers of the cleaned, unadulterated layers of intact carpet being subject to an application of third heat and pressure followed by an application of third cooling.

7. The method as recited in claim 1, wherein the adhesive material further comprises an adhesive selected from the group consisting of urethane adhesives, epoxy adhesives, melamine adhesives, and formaldehyde adhesives.

8. The method as recited in claim 1, wherein the adhesive material further comprises a urethane adhesive derived from a PET polyol reacted with an isocyanate.

9. The method as recited in claim 1, wherein the first unadulterated layer of carpet further comprises nylon fibers.

10. The method as recited in claim 1, wherein the first unadulterated layer of carpet further comprises polyester fibers.

11. The method as recited in claim 1, wherein applying first heat further comprises applying heat between 250° F. (121° C.) and 450° F. (232° C.).

12. The method as recited in claim 1, wherein applying first heat and pressure further comprises applying heat at 350° F. (176° C.).

13. The method as recited in claim 1, wherein applying first heat and pressure further comprises applying a continuous physical force to hold the initial, unfused carpet layer at the first fixed height.

14. The method as recited in claim 1, wherein applying first cooling further comprises applying cooling at 35° F. (1.7° C.) to 100° F. (37° C.).

15. The method as recited in claim 1, wherein applying first cooling further comprises applying cooling at 42° F. (5.6° C.).

16. A method of manufacturing a composite construction material, the method comprising:
   providing a plurality of cleaned, unadulterated layers of intact carpet, each of the plurality of cleaned, unadulterated layers of intact carpet having a backing side and a tufted side;
   creating an initial, unfused carpet layer by placing two cleaned, unadulterated layers of intact carpet of the plurality of cleaned, unadulterated layers of intact carpet side-to-side with homogenous and adhesive contact therebetween, the homogenous and adhesive contact including an adhesive material;
   applying first heat and pressure to the initial, unfused carpet layer within a first carrier having a first fixed height;
   applying first cooling to the initial, unfused carpet layer to form an initial, fused carpet layer;
   creating the composite construction material by iteratively adding additional layers of cleaned, unadulterated layers of intact carpet of the plurality of cleaned, unadulterated layers of intact contact carpet, each of the additional layers of the cleaned, unadulterated layers of intact carpet being added side-to-side with the homogenous and adhesive contact therebetween, each of the additional layers of the cleaned, unadulterated layers of intact carpet being subject to an application of second heat and pressure followed by an application of second cooling; and
   providing first and second fiberglass plates in a sealing engagement with respective first and second surfaces of the composite construction material, the first and second fiberglass plates being subjacent to at least one of the additional layers of the cleaned, unadulterated layers of intact carpet.

17. A method of manufacturing a composite construction material, the method comprising:
   providing a plurality of cleaned, unadulterated layers of intact carpet, each of the plurality of cleaned, unadulterated layers of intact carpet having a backing side and a tufted side;
   creating an initial, unfused carpet layer by placing two cleaned, unadulterated layers of intact carpet of the plurality of cleaned, unadulterated layers of intact carpet side-to-side with homogenous and adhesive contact therebetween, the homogenous and adhesive contact including an adhesive material;
   applying first heat and pressure to the initial, unfused carpet layer within a first carrier having a first fixed height;
   applying first cooling to the initial, unfused carpet layer to form an initial, fused carpet layer;
   creating the composite construction material by iteratively adding additional layers of cleaned, unadulterated layers of intact carpet of the plurality of cleaned, unadulterated layers of intact contact carpet, each of the additional layers of cleaned, unadulterated layers of intact carpet being added side-to-side with the homogenous and adhesive contact therebetween, each of the additional layers of cleaned, unadulterated layers of intact carpet being subject to an application of second heat and pressure followed by an application of second cooling; and
   providing a trellis integrated integral to the composite construction material, the trellis including first and second plates in a sealing engagement with respective first and second surfaces of the composite construction material.

* * * * *